(12) United States Patent
Zhang et al.

(10) Patent No.: US 9,618,914 B2
(45) Date of Patent: Apr. 11, 2017

(54) ENERGY RESOURCE-GRID-LOAD AUTOMATIC CONTROL SYSTEM OF SMART MICROGRID AND CONTROL METHODS THEREOF

(71) Applicant: Northeastern University, Shenyang, Liaoning Province (CN)

(72) Inventors: HuaGuang Zhang, Shenyang (CN); QiuYe Sun, Shenyang (CN); Jun Yang, Shenyang (CN); XinRui Liu, Shenyang (CN); ZhiLiang Wang, Shenyang (CN); Fei Teng, Shenyang (CN); Jing Guo, Shenyang (CN); ZhanShan Wang, Shenyang (CN); ZhenWei Liu, Shenyang (CN); YingChun Wang, Shenyang (CN)

(73) Assignee: Northeastern University, Shenyang, Liaoning Province (CN)

( * ) Notice: Subject to any disclaimer, the term of this patent is extended or adjusted under 35 U.S.C. 154(b) by 504 days.

(21) Appl. No.: 14/224,622

(22) Filed: Mar. 25, 2014

(65) Prior Publication Data

US 2014/0297051 A1    Oct. 2, 2014

(30) Foreign Application Priority Data

Mar. 26, 2013   (CN) .......................... 2013 1 0099733

(51) Int. Cl.
  *G05D 3/12*   (2006.01)
  *G05B 15/02*   (2006.01)

(52) U.S. Cl.
  CPC ............ *G05B 15/02* (2013.01); *Y02E 10/563* (2013.01); *Y02E 10/566* (2013.01); *Y02E 70/30* (2013.01); *Y02P 80/14* (2015.11)

(58) Field of Classification Search
  CPC ..... G05B 15/02; Y02E 10/563; Y02E 10/566; Y02E 70/30; Y02P 80/14
  (Continued)

(56) References Cited

U.S. PATENT DOCUMENTS

| 2004/0098142 A1* | 5/2004 | Warren | .................. F01D 15/10 700/22 |
| 2004/0167677 A1* | 8/2004 | Weiss | ..................... G06Q 40/04 700/291 |

(Continued)

OTHER PUBLICATIONS

Xinghuo et al., "The New Frontier of Smart Grids" IEEE, 2011, pp. 49-63.*

*Primary Examiner* — Robert Fennema
*Assistant Examiner* — Thomas Stevens
(74) *Attorney, Agent, or Firm* — Muncy, Geissler, Olds & Lowe, P.C.

(57) ABSTRACT

The present invention relates to an energy resource-grid-load automatic control system of smart microgrid and control methods thereof, which belong to the field of microgrid control and electrical technology. The energy resource-grid-load automatic control system includes a distributed renewable energy power generation module, a distributed renewable energy inverter module, a conventional power generation module, a user load module, a bidirectional grid-connected control module, a distributed renewable energy intelligent optimizing power generation control module, an energy storage module, an intelligent energy storage unit adjuster and a storage battery pack. Compared with the conventional microgrid including a distributed renewable energy power generation system, the present invention guarantees the stability and the high energy utilization of the power generation system and effectively solves the problem of non-uniform frequency of use of storage batteries to unify the service life of the storage battery pack.

6 Claims, 15 Drawing Sheets

(58) Field of Classification Search
USPC .......................................................... 700/287
See application file for complete search history.

(56) References Cited

U.S. PATENT DOCUMENTS

| | | | |
|---|---|---|---|
| 2009/0083167 A1* | 3/2009 | Subbloie | ................ G06Q 50/06 705/34 |
| 2013/0218355 A1* | 8/2013 | Lazaris | .............. G06Q 30/0605 700/291 |
| 2013/0253716 A1* | 9/2013 | Gross | ........................ G06F 1/26 700/287 |

* cited by examiner

ENERGY RESOURCE-GRID-LOAD AUTOMATIC CONTROL SYSTEM OF SMART MICROGRID AND CONTROL METHODS THEREOF

CROSS-REFERENCE TO RELATED APPLICATION

This application claims the priority of Chinese patent application No. 201310099733.0, filed on Mar. 26, 2013, which is incorporated herewith by reference.

BACKGROUND OF THE INVENTION

1. Field of the Invention

The present invention relates to an energy resource-grid-load automatic control system of smart microgrid and control methods thereof, which belong to the field of microgrid control and electrical technology.

2. The Prior Arts

With the economic development and the progress of science and technology, the decentralized and small-scale power systems have been gradually replaced by central stations with large-capacity and high-parameter units and by the modes of extra-high voltage long distance transmission and large grid interconnected and centralized power supply in pursuit of scale benefit in the industrial era. However, there are still some drawbacks of the main modes of generation, transmission and distribution of electric energy in response to the flexibility of load variation and the safety of power supply. In recent years, the energy crisis and the power failure of large power grids occur frequently. In addition, provinces in China have taken measures for power rationing to different degrees in summer in recent years. The power crisis and the large-scale power failure reveal that the existing huge power systems have defects. (1) It is possible that the fault of any point in the large power grids seriously affects the whole power grid, and even results in the large-scale power failure and the power grid collapse. (2) The large power grids cannot flexibly follow the load variation. With the increase of the load peak-valley difference, the load rate of the power grid declines year by year, and the utilization rate of power generation and transmission facilities tends towards decrease. (3) In some remote areas, the power supply is not ideal, because of long distance from power systems, harsh natural conditions, too large investment in power transmission and distribution construction or infeasibility of erection of power transmission and distribution lines. (4) In recent years, large power grids are often the targets of terrorist attacks and wars, and consequences will be unimaginable once these large power grids are destroyed. Moreover, the global primary energy suffers from exhaustion increasingly, and the environmental pollution caused by power generation, including acid rain, greenhouse effect and electromagnetic pollution, is becoming more and more obvious.

Considering the serious environmental problems, the supply safety of future energy sources and the reform of electric power systems, people have to pursue high efficient energy conversion, reduce emissions of hazardous substances, seek alternative fuels, implement graded use of energy and utilize a small-scale distributed power generation system, in order to meet the above-mentioned requirements.

If a distributed renewable energy microgrid is accessed to a distribution network, the structure of the power grid will be greatly affected, and accordingly the power grid including the microgrid needs to be replanned. However, conventional problems of power grid planning, such as load optimization, substation optimization and reactive power optimization, and a series of new problems of microgrid access points and access capacity optimization remain to be solved. Due to the bidirectional energy transfer between the microgrid and the large power grids, and the intermittence and the fluctuation of a distributed power source, the protection and the control strategy of the microgrid including the distributed power source differ from those of conventional power grids. It is difficult that the diversified demands of distribution users for the quality of power supply are satisfied as far as possible under the condition of stable operation of the large power grids. However, the renewable energy power generation and the energy storage equipment in the microgrid cannot be coordinated well, and the intelligent control of loads cannot be achieved in the prior art, thereby greatly hampering the development of the distributed power generation system.

SUMMARY OF THE INVENTION

In consideration of the shortage of the prior art, the present invention provides an energy resource-grid-load automatic control system of smart microgrid and control methods thereof, achieving the coordination of the distributed renewable energy power generation and the energy storage module in the microgrid and the intelligent control of power consumption of user loads.

The present invention relates to an energy resource-grid-load automatic control system of smart microgrid, comprising: a distributed renewable energy power generation module, a distributed renewable energy inverter module, a conventional power generation module, a user load module, a bidirectional grid-connected control module, a distributed renewable energy intelligent optimizing power generation control module and an energy storage module, wherein the distributed renewable energy power generation module is used for converting solar energy, wind energy and biomass energy into electric energy and supplying power to loads or power grids; the distributed renewable energy inverter module is used for converting direct current discharged from photovoltaic panels, wind turbines and biomass energy power generation equipment into alternating current; the conventional power generation module is used for controlling micro gas turbines to supply power to the user loads or the power grids; the user load module is a local load in the microgrid; and the bidirectional grid-connected control module is used for controlling connection/disconnection and energy transfer between the microgrid and the power grids. The distributed renewable energy intelligent optimizing power generation control module is used for: 1) acquiring nodal voltage and current of the photovoltaic panels, the wind turbines and the biomass energy power generation equipment, estimating the power generation capacity of the photovoltaic panels, the wind turbines and the biomass energy power generation equipment within 4 to 5 sampling periods by uncertainty estimation, plotting the forecast fluctuation curves of the power generation capacity, respectively calculating the robustness of the photovoltaic panels, the wind turbines and the biomass energy power generation equipment, and selecting the one with the best robustness to supply power to the user loads or the power grids; 2) sending a control signal to an intelligent energy storage unit adjuster when there is a difference between the actual power generation capacity of the photovoltaic panels, the wind turbines and the biomass energy power generation equipment and the total electric energy supplied to the user loads and the power grids; and 3) sending control signals to micro gas turbine power generation controllers when the power generation capacity of the photovoltaic panels, the wind turbines and the biomass energy power generation equipment and the electric energy released from the energy storage module differ from the total electric energy required by the user loads and the power grids. The energy storage module is used for controlling the charging and discharging of a storage battery pack to ensure the average charging and discharging times of each storage battery.

The energy storage module comprises the intelligent energy storage unit adjuster and the storage battery pack, wherein if the remaining electric energy of the photovoltaic panels, the wind turbines and the biomass energy power generation equipment is received, the intelligent energy storage unit adjuster calculates the total charging and discharging times of each storage battery, then compares the result with the average of the total charging and discharging times of all storage batteries, and selects the storage battery with the largest difference for charging; if the power generation capacity of the photovoltaic panels, the wind turbines and the biomass energy power generation equipment cannot meet the needs of the user loads or the power grids, the intelligent energy storage unit adjuster receives a power generation control signal sent by a distributed renewable energy intelligent optimizing power generation controller to control the storage battery pack to discharge, calculates the total charging and discharging times of each storage battery, compares the result with the average of the total charging and discharging times of all storage batteries, and selects the storage battery with the largest difference for discharging; the storage battery pack is used for storing or releasing the remaining electric energy of the photovoltaic panels, the wind turbines and the biomass energy power generation equipment.

The conventional power generation module comprises a micro gas turbine intelligent optimizing power generation control unit and a micro gas turbine power generation unit, wherein the micro gas turbine intelligent optimizing power generation control unit is used for replenishing the user loads or the power grids with the electric energy generated by the micro gas turbines when the power generation capacity of the photovoltaic panels, the wind turbines and the biomass energy power generation equipment and the electric energy released from the energy storage module cannot meet the needs of the user loads or the power grids; and the micro gas turbine power generation unit is used for supplying power to the user loads or the power grids.

The user load module comprises an intelligent optimizing power consumption controller and state collectors, wherein the intelligent optimizing power consumption controller is used for establishing a load matrix of voltage and current signals acquired at load ends by the state collectors, constructing laws of power consumption of the user loads by neural network mod ling, and automatically controlling the power consumption of the user loads by the laws; and the state collectors are used for acquiring nodal voltage and current at the user load ends in real time.

The distributed renewable energy power generation module is connected with the distributed renewable energy inverter module by DC buses; the DC buses consist of three segments and are arranged separately; the output ends of a photovoltaic power generation unit are respectively connected with the input ends of a photovoltaic power generation inverter unit by the first segment of DC bus, the second segment of DC bus and the third segment of DC bus; the output ends of a wind power generation unit, are respectively connected with the input ends of a wind power generation inverter unit by the first segment of DC bus, the second segment of DC bus and the third segment of DC bus; the output ends of a biomass energy power generation unit are respectively connected with the input ends of a biomass energy power generation inverter unit by the first segment of DC bus, the second segment of DC bus and the third segment of DC bus.

The input end of the energy storage module is simultaneously connected with the first segment of DC bus, the second segment of DC bus and the third segment of DC bus.

Control methods of the energy resource-grid-load automatic control system of smart microgrid comprise an intelligent optimizing control method for distributed renewable energy power generation, a control method for charging and discharging of the energy storage unit and a coordination method for laws of power consumption of the user loads, wherein the intelligent optimizing control method for distributed renewable energy power generation comprises the following steps of:

step 1: acquiring nodal voltage and current of the photovoltaic panels, the wind turbines and the biomass energy power generation equipment by Hall element measurement;

step 2: estimating the power generation capacity of the photovoltaic panels, the wind turbines and the biomass energy power generation equipment by uncertainty estimation, including resistance, reactance and PV nodal voltage; wherein the specific formulas are shown as follows: for estimation of resistance and reactance:

$$R_{m+4}=R_{m+3}=R_{m+2}=R_{m+1}=0.01R_{m-7}+0.03R_{m-6}+0.06R_{m-5}+0.1R_{m-4}+0.15R_{m-3}+0.16R_{m-2}+0.22R_{m-1}+0.30R_m \quad (1)$$

where: $R_m$ represents the resistance in the mth sampling period; $R_{m+n}$ represents the estimated resistance in the (m+n)th sampling period, wherein n=−7, −6, −5, −4, −3, −2, −1, 1, 2, 3, 4;

$$X_{m+4}=X_{m+3}=X_{m+2}=X_{m+1}=0.15X_{m-2}+0.25X_{m-1}+0.6X_m \quad (2)$$

where: $X_m$ represents the reactance in the mth sampling period; $X_{m+p}$ represents the estimated reactance in the (m+p)th sampling period, wherein p=−2, −1, 1, 2, 3, 4;

for estimation of PV nodal voltage:

$$U_{+4}=U_{+3}=U_{+2}U_{+1}=0.01U_{m-7}+0.03U_{m-6}+0.06U_{m-5}+0.1U_{m-4}+0.15U_{m-3}+0.16U_{m-2}+0.22U_{m-1}+0.30U \quad (3)$$

where: $U_m$ represents the PV nodal voltage in the mth sampling period; $U_{m+n}$ represents the estimated PV nodal voltage in the (m+n)th sampling period, wherein n=−7, −6, −5, −4, −3, −2, −1, 1, 2, 3, 4;

step 3: plotting the forecast fluctuation curves of the power generation capacity according to the PV nodal voltage obtained in Step 2, with the time as the abscissa and the PV nodal voltage as the ordinate;

step 4: calculating the robustness of the power generation capacity of the photovoltaic panels, the wind turbines and the biomass energy power generation equipment, and selecting the one with the best robustness to supply power to the user loads or the power grids; the formula for calculation of the robustness is shown as follows:

$$D_N = \frac{1}{7}\sqrt{(U_m - U_{ms})^2 + (U_{m-1} - U_{ms})^2 + (U_{m-3} - U_{ms})^2 + (U_{m-5} - U_{ms})^2 + (U_{m-7} - U_{ms})^2} \quad (4)$$

$D_N$ represents a robustness value, and a smaller value indicates that the robustness is better; $U_{ms}$ represents nodal voltage in a mains supply;

step 5: calculating the total electric energy supplied to the user loads and the power grids by the photovoltaic panels, the wind turbines and the biomass energy power generation equipment, with the formula shown as follows:

$$W_N = \frac{\alpha D_N}{D_1 + D_2 + D_3 + \ldots + D_{N-2} + D_{N-1} + D_N} W \quad (5)$$

where: $W_N$ represents the total electric energy mentioned in Step 5, and W represents the total electric energy actually required by the user loads and the power grids; α represents a parameter of power generation type; for the wind turbines, α=0.1; for the photovoltaic panels, α=0.83; for the biomass energy power generation equipment, α=0.92;

step 6: calculating the difference between the actual power generation capacity of the photovoltaic panels, the wind turbines and the biomass energy power generation equipment and the total electric energy supplied to the user loads and the power grids, with the formula shown as follows:

$$W_{storageN} = W_{outN} - W_N \quad (6)$$

where: $W_{storageN}$ represents the difference between the actual power generation capacity of the photovoltaic panels, the wind turbines and the biomass energy power generation equipment and the total electric energy supplied to the user loads and the power grids; $W_{outN}$ represents the actual power generation capacity of the photovoltaic panels, the wind turbines and the biomass energy power generation equipment;

step 7: if $W_{storageN}$=0, directly supplying power to the user loads and the power grids by the one with the best robustness in the photovoltaic panels, the wind turbines and the biomass energy power generation equipment; if $W_{storageN}$>0, storing the remaining electric energy of the photovoltaic panels, the wind turbines and the biomass energy power generation equipment into the energy storage module; and if $W_{storageN}$<0, replenishing the user loads and the power grids by discharging of the energy storage module; and step 8: calculating the difference $W_E$ between the actual power generation capacity of the photovoltaic panels, the wind turbines and the biomass energy power generation equipment and the total electric energy actually required by the user loads and the power grids, with the formula shown as follows:

$$W_E = W - W_N \quad (7)$$

if $W_E$>0, replenishing the user loads and the power grids by the micro gas turbines with an amount of $W_E$.

The control method for charging and discharging of the energy storage unit comprises the following steps of:

step 1: if the remaining electric energy released by the photovoltaic panels, the wind turbines and the biomass energy power generation equipment is received, carrying out step 2 for storage battery charging; if a control signal sent by the distributed renewable energy intelligent optimizing power generation controller is received, carrying out step 3 for storage battery discharging;

step 2: counting the charging and discharging times c of each storage battery; calculating the total charging and discharging times of all storage batteries and obtaining an average C; then calculating the difference between C and c, and taking the storage battery with the largest absolute value of the difference as a charging object; and step 3: counting the charging and discharging times c of each storage battery; calculating the total charging and discharging times of all storage batteries and obtaining an average C; then calculating the difference between C and c and taking the storage battery with the largest absolute value of the difference as a discharging object.

The coordination method for laws of power consumption of the user loads comprises the following steps of:

step 1: establishing a neural network model according to the historical data of nodal voltage and current acquired at the user load ends to predict laws of power consumption of the user loads;

step 2: acquiring nodal voltage and current at the user load ends in real time by the state collectors, and continually correcting the neural network model in Step 1; and step 3: releasing the total electric energy actually required by the user loads from the intelligent optimizing power consumption controller to the distributed renewable energy intelligent optimizing power generation controller according to the electric energy corrected in Step 2, and starting the corresponding ones of the photovoltaic panels, the wind turbines, the biomass energy power generation equipment, the energy storage module and the conventional power generation module to supply power.

The present invention has the following advantages:

a) Compared with the conventional microgrid comprising a distributed renewable energy power generation system, the energy resource-grid-load automatic control system of smart microgrid and control methods thereof reasonably monitor all distributed renewable energy power generation units in the microgrid, forecast the power generation states of all distributed renewable energy power generation units, adjust the ratio of the electric energy released by each distributed renewable energy power generation unit to the total required electric energy by judging the robustness of all distributed renewable energy power generation units, and ensure the stability of the power generation system and the higher rate of energy utilization to the largest extent.

b) Unlike the conventional energy storage module, the energy storage module of the present invention is added with the intelligent energy storage unit adjuster, thereby effectively solving the problem of nonuniform use of all storage batteries, unifying the whole service life of the storage battery pack, improving the energy storage efficiency of the system and benefiting the environmental protection.

c) The intelligent optimizing power consumption controller can reasonably predict the power consumption of the user loads, and accordingly, reasonably adjust the future power generation state of each power generation unit in the system within the whole microgrid. In addition, the intelligent optimizing power consumption controller can reasonably prevent possible faults and potential hazards.

DETAILED DESCRIPTION OF THE PREFERRED EMBODIMENT

The present invention is further described by figures and the embodiment as follows:

In the embodiment, an energy resource-grid-load automatic control system of smart microgrid and control methods thereof can be further explained as a system and control methods thereof, which are applicable to the smart microgrid and automatically control power supply, power grids and loads.

In the embodiment, the type of the wind turbines is SN-1000W. The type of the photovoltaic panels is SN-120W. The type of the micro gas turbines is DTE846. The type of the Digital Signal Processor (DSP) is TMS320F2407A. The inverters are MM440 single-phase-input and three-phase-output inverters of 120 W. The type of the storage batteries is 6-GFM-200 Ah.

Figure 1:
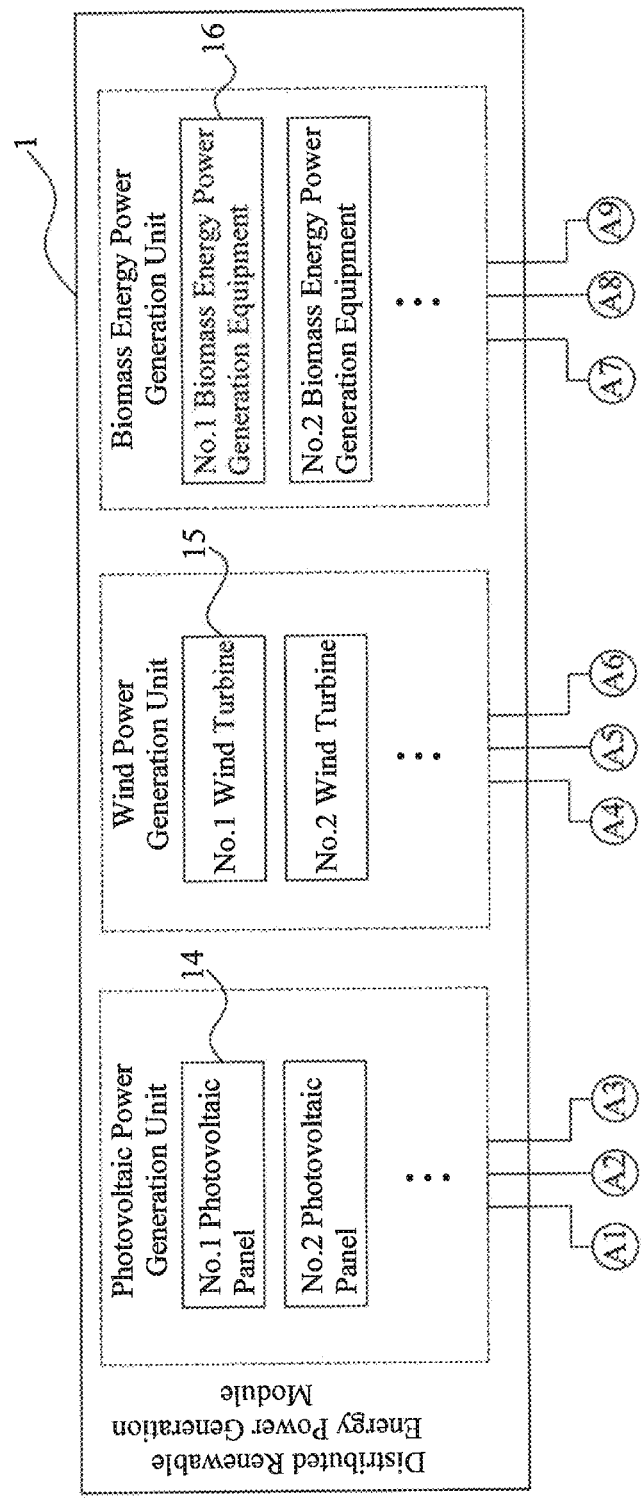
FIG. 1 is the overall structural diagram of the energy resource-grid-load automatic control system of smart microgrid in the present invention.
Figure 1:
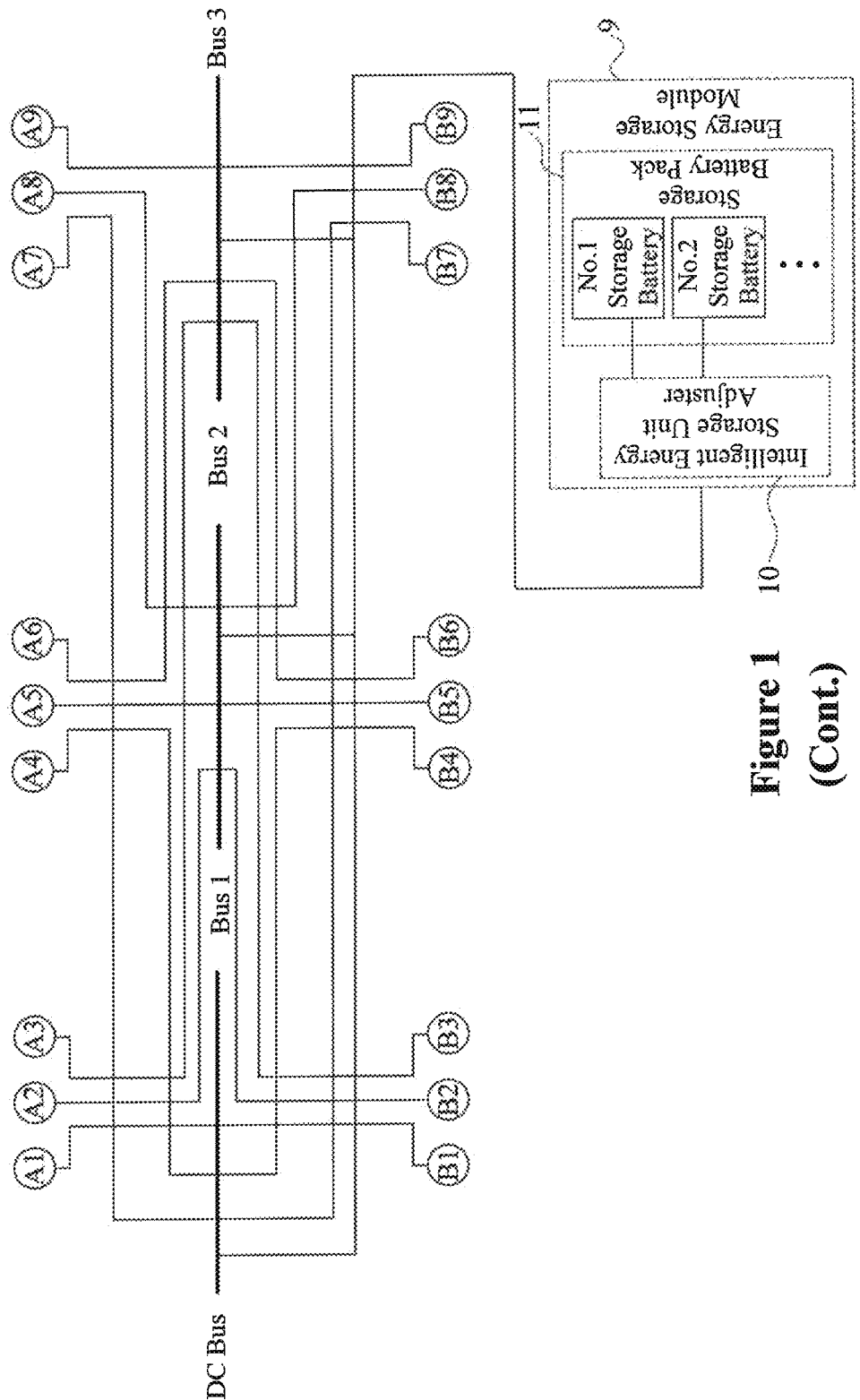
Figure 1:
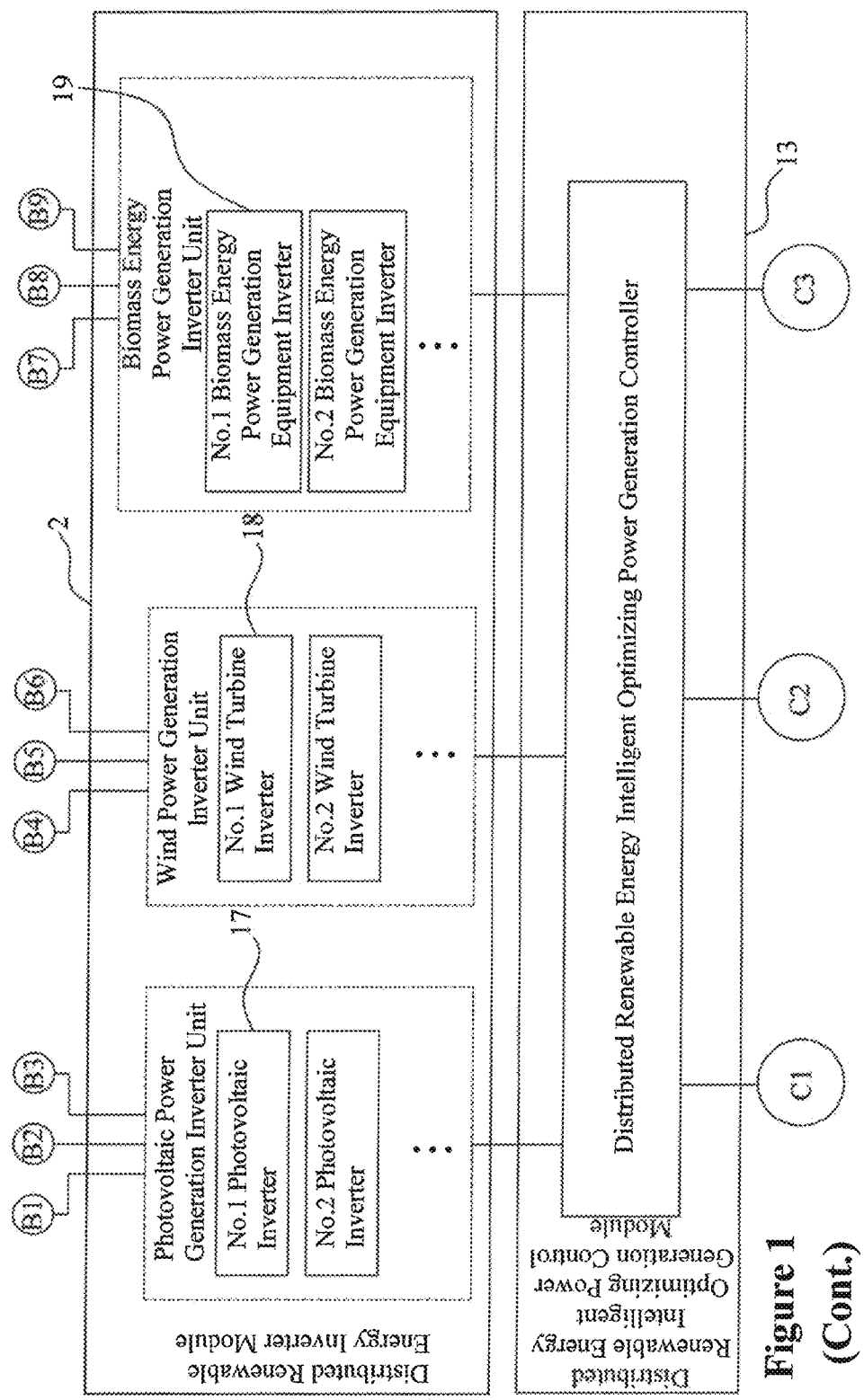
Figure 1:
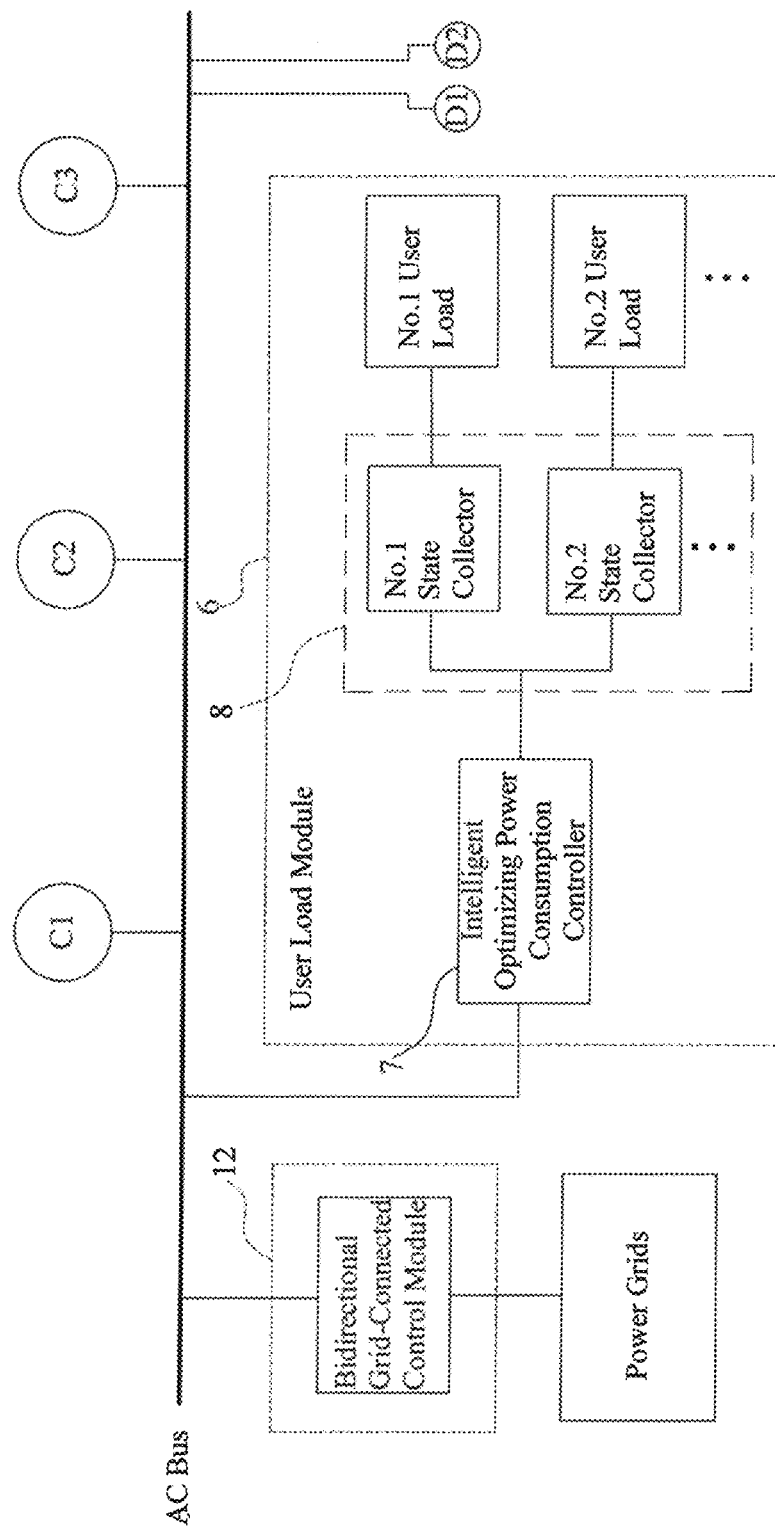
Figure 1:
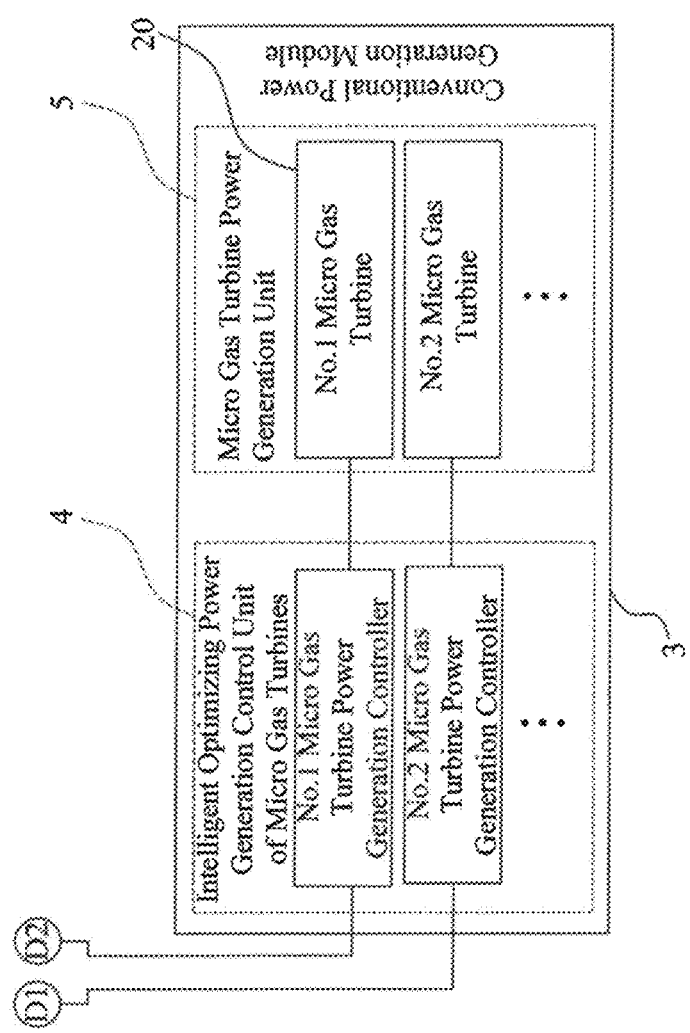
Figure 2:
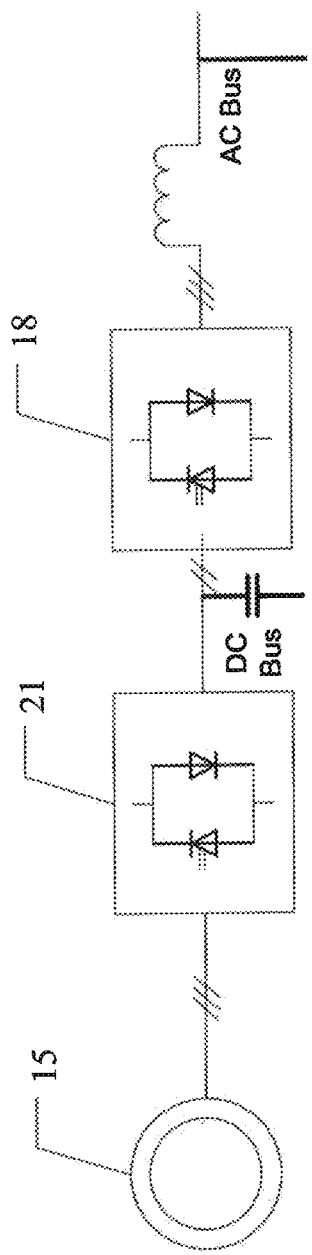
FIG. 2 is the schematic diagram of the access circuit of the wind turbines in the energy resource-grid-load automatic control system of smart microgrid in the present invention.
Figure 3:
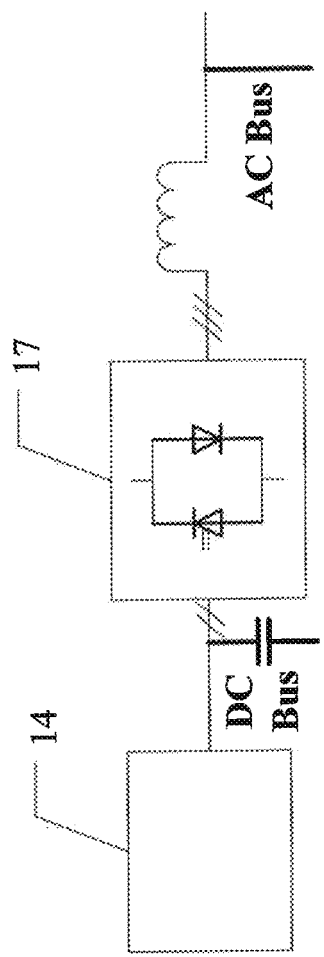
FIG. 3 is the schematic diagram of the access circuit of the photovoltaic panels in the energy resource-grid-load automatic control system of smart microgrid in the present invention.
Figure 4:
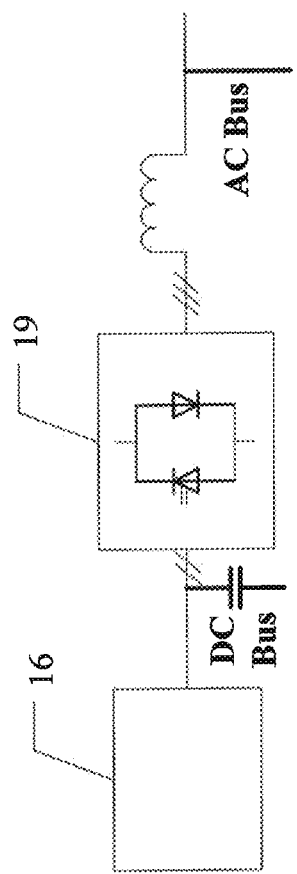
FIG. 4 is the schematic diagram of the access circuit of the biomass energy power generation equipment in the energy resource-grid-load automatic control system of smart microgrid in the present invention.
Figure 5:
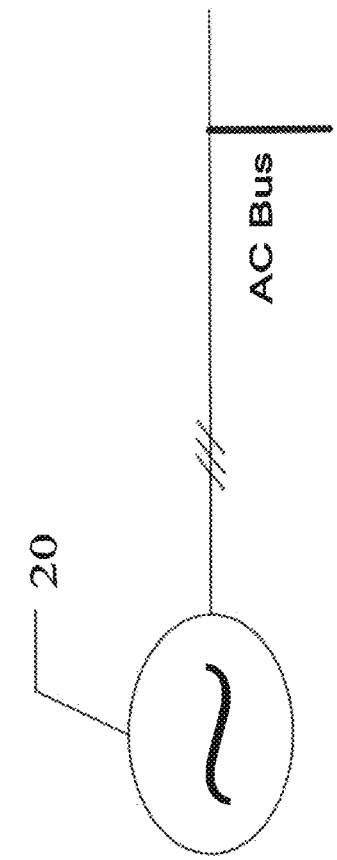
FIG. 5 is the schematic diagram of the access circuit of the micro gas turbines in the energy resource-grid-load automatic control system of smart microgrid in the present invention.

In the embodiment, as shown in FIG. 1, the energy resource-grid-load automatic control system of smart microgrid comprises the distributed renewable energy power generation module 1, the distributed renewable energy inverter module 2, the distributed renewable energy intelligent optimizing power generation control module 13, the conventional power generation module 3, the user load module 6, the energy storage module 9 and the bidirectional grid-connected control module 12. The distributed renewable energy power generation module 1 further comprises the photovoltaic power-generation unit, the wind power generation unit and the biomass energy power generation equipment wherein the photovoltaic power generation unit comprises at least one photovoltaic panel, the wind power generation unit comprises at least one wind turbine, and the biomass energy power generation equipment comprises at least one biomass energy power generation equipment. The distributed renewable energy inverter module 2 further comprises the photovoltaic power generation inverter unit, the wind power generation inverter unit and the biomass energy power generation inverter unit. The photovoltaic power generation inverter unit comprises at least one photovoltaic inverter, the wind power generation inverter unit comprises at least one wind turbine inverter, and the biomass energy power generation inverter unit comprises at least one piece of biomass energy power generation equipment inverter. The distributed renewable energy intelligent optimizing power generation control module 13 comprises the distributed renewable energy intelligent optimizing power generation controller. The conventional power generation module 3 further comprises the micro gas turbine intelligent optimizing power generation control unit 4 and the micro gas turbine power generation unit 5, wherein the micro gas turbine intelligent optimizing power generation control unit 4 comprises at least one micro gas turbine power generation controller, and the micro gas turbine power generation unit 5 comprises at least one micro gas turbine. The user load module 6 further comprises the intelligent optimizing power consumption controller 7, at least one state collector 8 and at least one user load. The energy storage module 9 further comprises the intelligent energy storage unit adjuster 10 and the storage battery pack 11, wherein the storage battery pack 11 comprises at least one storage battery.

In the embodiment, three segments of DC bus (Bus 1, Bus 2 and Bus 3 as shown in FIG. 1) are used and are not interconnected.

In the embodiment, the connection of the energy resource-grid-load automatic control system of smart microgrid is as follows: The output ends of a photovoltaic power generation unit are respectively connected with the input ends of a photovoltaic power generation inverter unit by the first segment of DC bus (Bus 1), the second segment of DC bus (Bus 2) and the third segment of DC bus (Bus 3); the output ends of a wind power generation unit are respectively connected with the input ends of a wind power generation inverter unit by the first segment of DC bus (Bus 1), the second segment of DC bus (Bus 2) and the third segment of DC bus (Bus 3); the output ends of a biomass energy power generation unit are respectively connected with the input ends of a biomass energy power generation inverter unit by the first segment of DC bus (Bus 1), the second segment of DC bus (Bus 2) and the third segment of DC bus (Bus 3); the input end of the intelligent energy storage unit adjuster is respectively connected with the first segment of DC bus (Bus 1), the second segment of DC bus (Bus 2) and the third segment of DC bus (Bus 3); the output ends of the intelligent energy storage unit adjuster are connected with the input ends of the storage battery pack; the output end of the photovoltaic power generation inverter unit, the output end of the wind power generation inverter unit and the output end of the biomass energy power generation inverter unit are connected with the input ends of the distributed renewable energy intelligent optimizing power generation controller; the output ends of the distributed renewable energy intelligent optimizing power generation controller are respectively connected with the input ends of the micro gas turbine power generation controllers, the input end of the intelligent optimizing power consumption controller and the input end of the bidirectional grid-connected control module by AC buses; the input ends of the micro gas turbine power generation controllers are respectively connected with the output ends of the distributed renewable energy intelligent optimizing power generation controller, the input end of the intelligent optimization power consumption controller and the input end of the bidirectional grid-connected control module by AC buses; the output ends of the micro gas turbine power generation controllers are connected with the input ends of the micro gas turbines; the output end of the intelligent optimizing power consumption controller is connected with the input ends of the state collectors; the output ends of the state collectors are connected with the input ends of the user loads; the output end of the bidirectional grid-connected control module is connected with the power grids.

In the embodiment, the access circuits of the photovoltaic panels, the wind turbines, the biomass energy power generation equipment and the micro gas turbines are shown in FIGS. 2, 3, 4 and 5. The direct current generated by the photovoltaic panels 14 and the biomass energy power generation equipment 16 is inverted by the photovoltaic inverters 17 and the biomass energy power generation equipment inverters 19 into alternating current, and then the alternating current is supplied to the user loads and the power grids by AC buses; the electric energy released by the wind turbines 15 is rectified into stable direct current by the rectifier 21, the direct current is inverted into alternating current by the wind turbine inverters 18, and then the alternating current is supplied to the user loads and the power grids by AC buses; the alternating current generated by the micro gas turbines 20 is supplied to the user loads and the power grids by AC buses.

Figure 6:
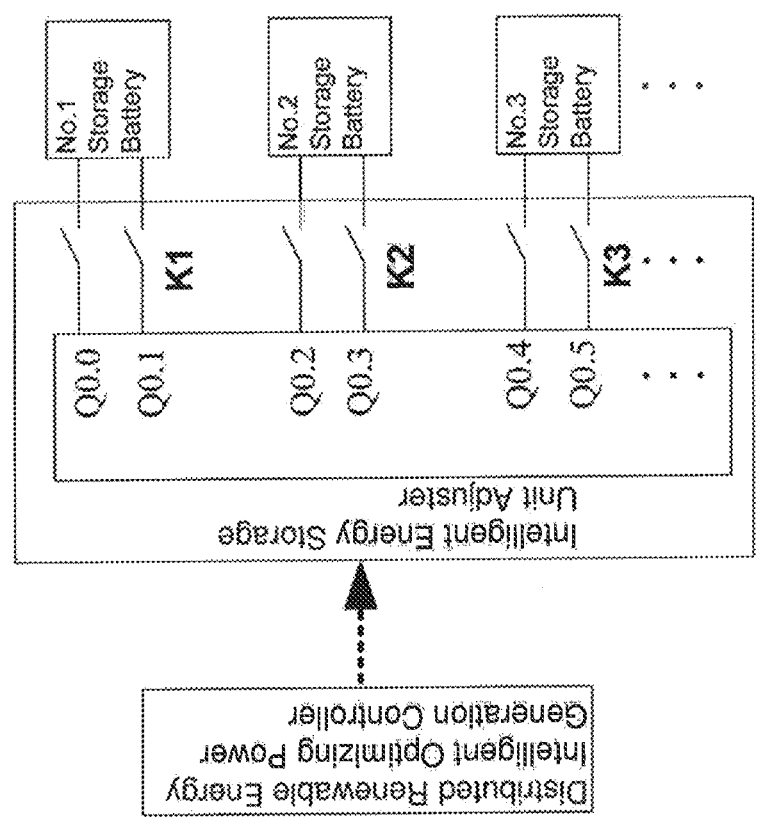
FIG. 6 is the structural diagram of the intelligent energy storage unit adjuster in the energy resource-grid-load automatic control system of smart microgrid in the present invention.
Figure 7:
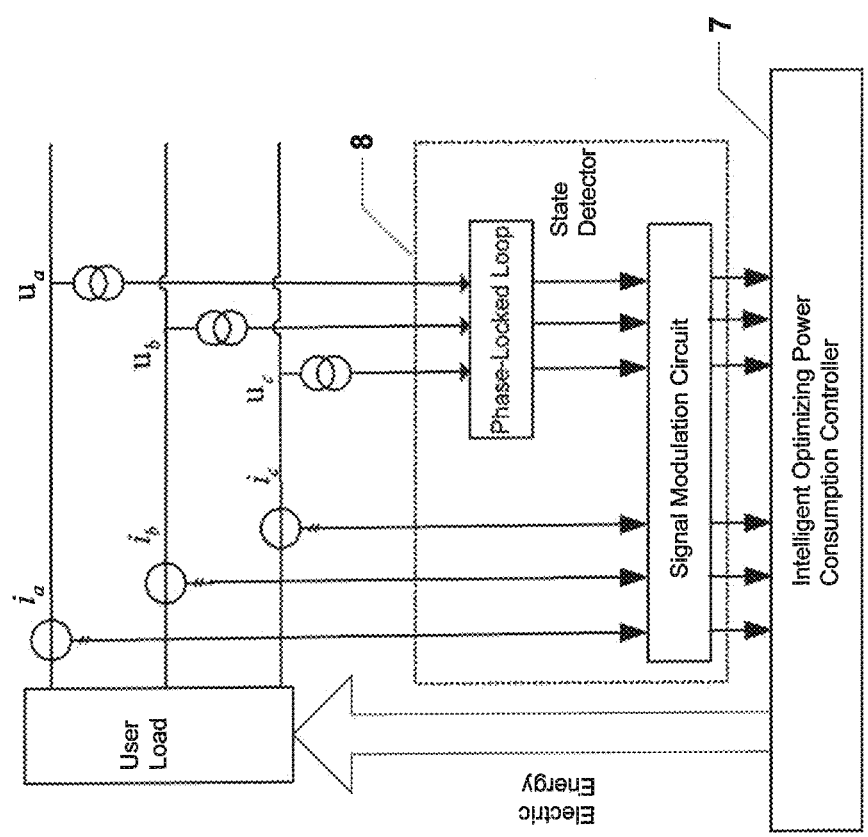
FIG. 7 is the structural diagram of the intelligent optimizing power consumption controller in the energy resource-grid-load automatic control system of smart microgrid in the present invention.

In the embodiment, the distributed renewable energy intelligent optimizing power generation controller, the micro gas turbine power generation controllers, the intelligent optimizing power consumption controller, the state collectors, the intelligent energy storage unit adjuster and the bidirectional grid-connected control module all use DSPs as core chips. The structure of the intelligent energy storage unit adjuster is shown in FIG. 6, the distributed renewable energy intelligent optimizing power generation controller sends a control signal to the DSP of the intelligent energy storage unit adjuster, and the DSP sends output signals to control the charging and discharging process of the storage battery pack. The DSP mentioned here has 6 output signals. The output ends Q0.0 and Q0.1 of the DSP are respectively connected with two input ends of No. 1 storage battery and provide charging or discharging control signals for No. 1 storage battery to control the on-off action of the switch K1; the output ends Q0.2 and Q0.3 of the DSP are respectively connected with two input ends of No. 2 storage battery and provide charging or discharging control signals for No. 2 storage battery to control the on-off action of the switch K2; the output ends Q0.4 and Q0.5 of the DSP are respectively connected with two input ends of No. 3 storage battery and provide charging or discharging control signals for No. 3 storage battery to control the on-off action of the switch K3. The structure of the intelligent optimizing power consumption controller is shown in FIG. 7. When one user load exists, the state collector acquires nodal voltage and current of the user load, the nodal voltage and current are introduced into the intelligent optimizing power consumption contoller after passing through a phase-locked loop and a signal modulation circuit (the phase-locked loop and the signal modulation circuit form a state detector), and the intelligent optimizing power consumption controller obtains laws of power consumption of the user load on the basis of the neural network and supplies electric energy to the user load according to the laws.

Figure 10:
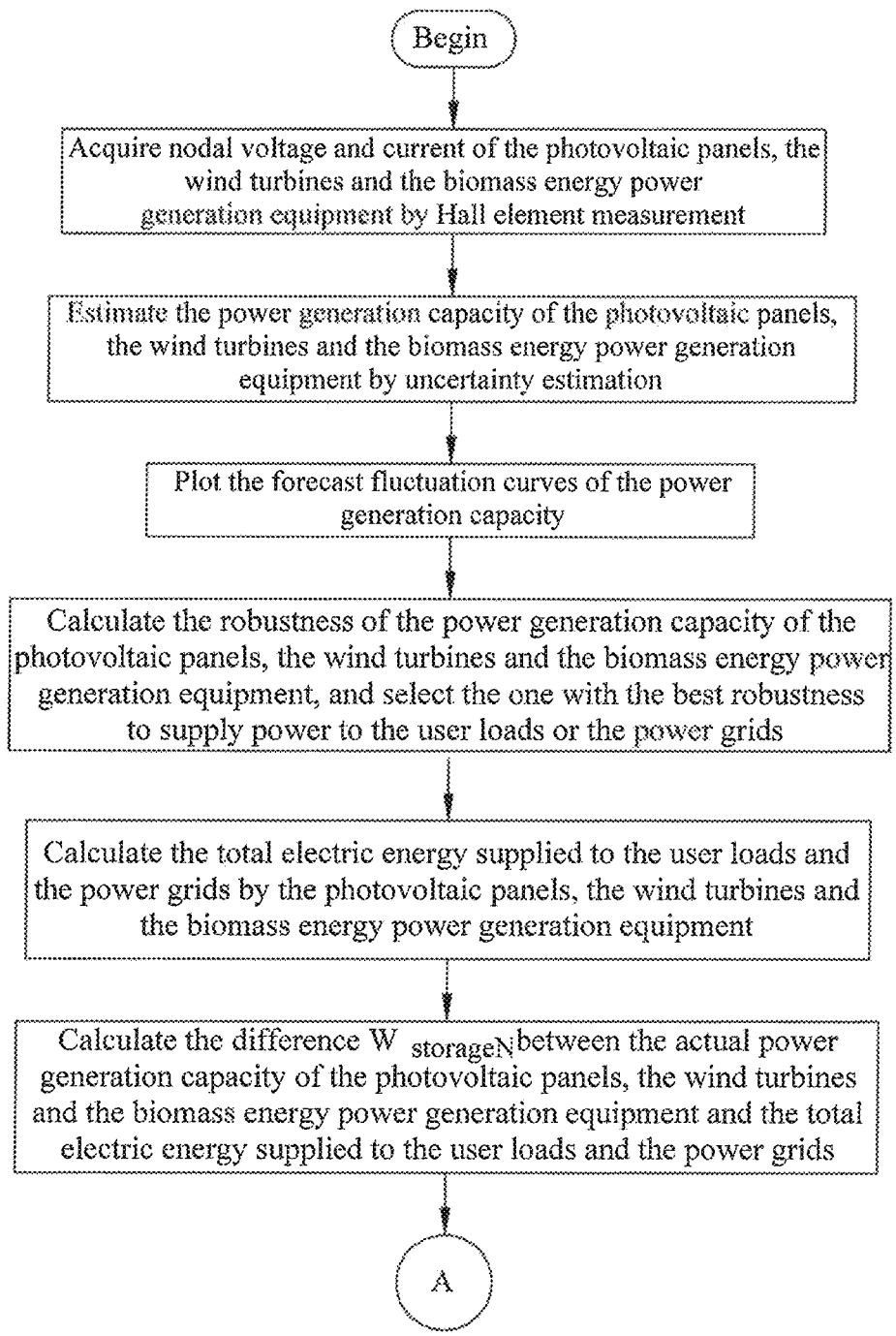
FIG. 10 is the flow chart of the intelligent optimizing control method for distributed renewable energy power generation in the present invention.
Figure 10:
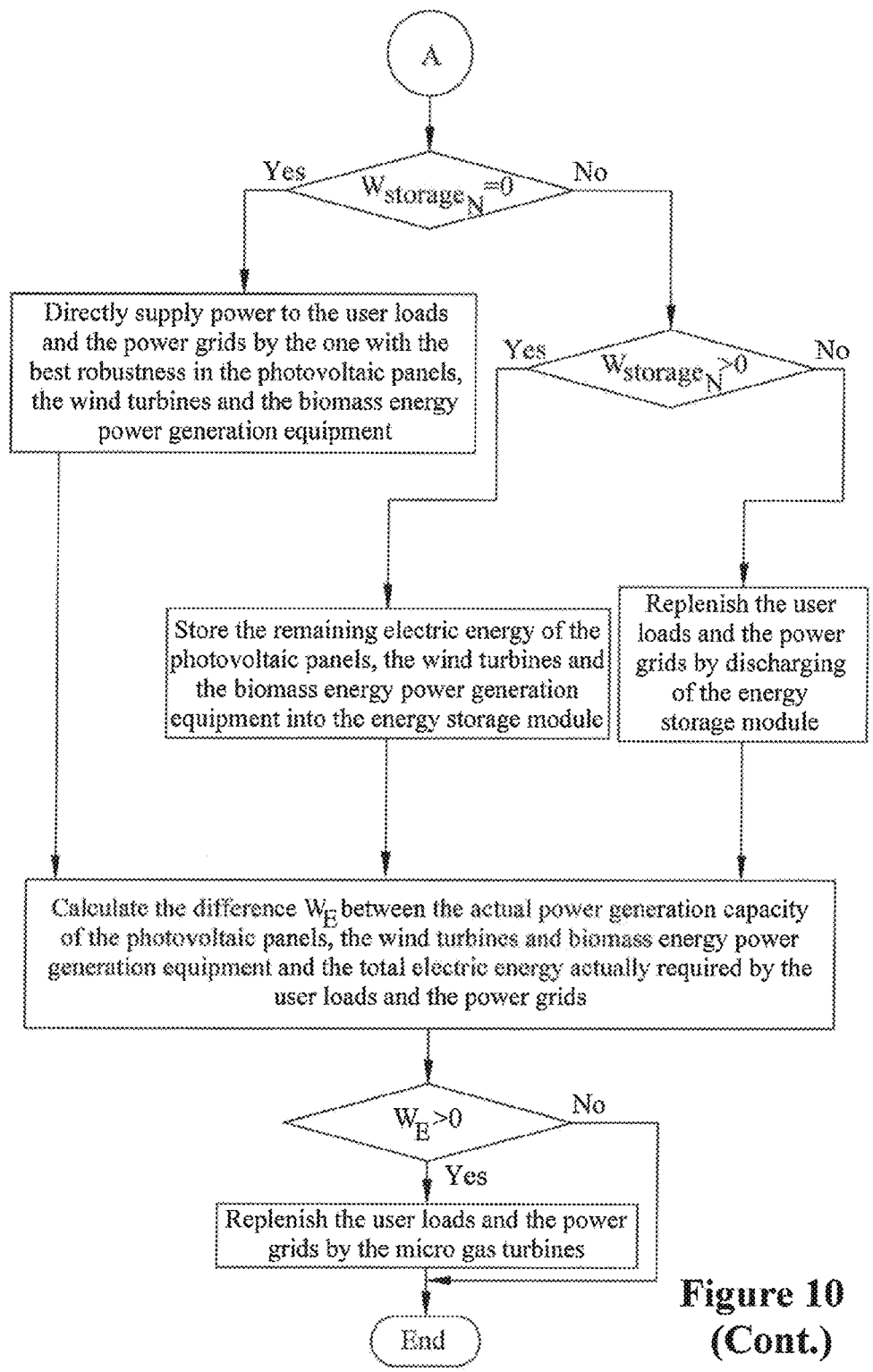

In the embodiment, the flow of the intelligent optimizing control method for distributed renewable energy power generation is shown in FIG. 10 and comprises the following steps of:

Step 1: Acquiring nodal voltage and current of the photovoltaic panels, the wind turbines and the biomass energy power generation equipment by Hall element measurement;

Specifically, the Hall element measurement is to measure the nodal voltage and current of the photovoltaic panels, the wind turbines and the biomass energy power generation equipment by Hall effect;

The voltage and current data acquired in the experiment is expressed in a matrix form as shown below:

$$\begin{bmatrix} \dot{U}_1 \\ \dot{U}_2 \\ \vdots \\ \dot{U}_N \end{bmatrix} = \begin{bmatrix} Z_{11} & Z_{12} & \ldots & Z_{1N} \\ Z_{21} & Z_{22} & \ldots & Z_{2N} \\ \vdots & \vdots & & \vdots \\ Z_{N1} & Z_{N2} & \ldots & Z_{NN} \end{bmatrix} \begin{bmatrix} \dot{I}_1 \\ \dot{I}_2 \\ \vdots \\ \dot{I}_N \end{bmatrix}$$

In the 10th minute after power generation, measured nodal voltage and current are:

$$\begin{bmatrix} 220.5 \\ 219.8 \\ \vdots \\ 221.3 \end{bmatrix} = \begin{bmatrix} 23.4 & 103.2 & \ldots & 43.2 \\ 76.2 & 3.21 & \ldots & 21.9 \\ \vdots & \vdots & & \vdots \\ 76.2 & 65.4 & \ldots & 56.7 \end{bmatrix} \begin{bmatrix} 1.25 \\ 0.89 \\ \vdots \\ 1.73 \end{bmatrix}$$

Step 2: Estimating the power generation capacity of the photovoltaic panels, the wind turbines and the biomass energy power generation equipment by uncertainty estimation, including resistance, reactance and PV nodal voltage. The specific formulas are shown as follows:

For estimation of resistance and reactance:

$$R_{m+4} = R_{m+3} = R_{m+2} = R_{m+1} = 0.01 R_{m-7} + 0.03 R_{m-6} + 0.06 R_{m-5} + 0.1 R_{m-4} + 0.15 R_{m-3} + 0.16 R_{m-2} + 0.22 R_{m-1} + 0.30 R_m \quad (8)$$

Where: $R_m$ represents the resistance in the mth sampling period; $R_{m+n}$ represents the estimated resistance in the (m+n)th sampling period, wherein n=−7, −6, −5, −4, −3, −2, −1, 1, 2, 3, 4;

$$X_{m+4} = X_{m+3} = X_{m+2} = X_{m+1} = 0.15 X_{m-2} + 0.25 X_{m-1} + 0.6 X_m \quad (9)$$

Where: $X_m$ the reactance in the mth sampling period; $X_{m+p}$ represents the estimated reactance in the (m+p)th sampling period, wherein p=−2, −1, 1, 2, 3, 4;

For estimation of PV nodal voltage:

$$U_{+4} = U_{+3} = U_{+2} = U_{+1} = 0.01 U_{m-7} + 0.03 U_{m-6} + 0.06 U_{m-5} + 0.1 U_{m-4} + 0.15 U_{m-3} + 0.16 U_{m-2} + 0.22 U_{m-1} + 0.30 U_m \quad (10)$$

Where: $U_m$ represents the PV nodal voltage in the mth sampling period; $U_{m+n}$ represents the estimated PV nodal voltage in the (m+n)th sampling period, wherein n=−7, −6, −5, −4, −3, −2, −1, 1, 2, 3, 4;

Assuming that nodal voltage and current in each sampling period do not change, i.e. the sampling period is set as 20 ms, the nodal voltage of the distributed power source in the subsequent 80 ms is obtained by the formula (3):

$$U_1=220.3;$$

Step 3: Plotting the forecast fluctuation curves of the power generation capacity according to the PV nodal voltage obtained in Step 2, with the time as the abscissa and the PV nodal voltage as the ordinate;

Step 4: Calculating the robustness of the power generation capacity of the photovoltaic panels, the wind turbines and the biomass energy power generation equipment, and selecting the one with the best robustness to supply power to the user loads or the power grids; the formula for calculation of the robustness is shown as follows:

$$D_N = \frac{1}{7}\sqrt{\begin{array}{c}(U_m - U_{ms})^2 + (U_{m-1} - U_{ms})^2 + (U_{m-3} - U_{ms})^2 + \\ (U_{m-5} - U_{ms})^2 + (U_{m-7} - U_{ms})^2\end{array}} \quad (11)$$

$D_N$ represents a robustness value, and a smaller value indicates that the robustness is better; $U_{ms}$ represents nodal voltage in a mains supply;

Assuming that the distributed energy resource is No. 2 photovoltaic panel, the robustness $D_2$ is calculated according to the formula (4):

$$D_2=0.0714$$

Step 5: Calculating the total electric energy supplied to the user loads and the power grids by the photovoltaic panels, the wind turbines and the biomass energy power generation equipment, with the formula shown as follows:

$$W_N = \frac{\alpha D_N}{D_1 + D_2 + D_3 + \ldots + D_{N-2} + D_{N-1} + D_N} W \quad (12)$$

Where: $W_N$ represents the total electric energy mentioned in Step 5, and W represents the total electric energy actually required by the user loads and the power grids; $\alpha$ represents a parameter of power generation type; for the wind turbines, $\alpha=0.1$; for the photovoltaic panels, $\alpha=0.83$; for the biomass energy power generation equipment, $\alpha=0.92$;

Because the photovoltaic panel is used in the embodiment now, $\alpha=0.83$. If the total electric energy actually required by the user loads and the power grids is 500 KW, the total electric energy supplied to the user loads and the power grids by No. 2 photovoltaic panel is calculated according to the formula (5):

$$W_2=113.5 \text{ KW}$$

Step 6: Calculating the difference between the actual power generation capacity of the photovoltaic panels, the wind turbines and the biomass energy power generation equipment and the total electric energy supplied to the user loads and the power grids, with the formula shown as follows:

$$W_{storageN}=W_{outN}-W_N \quad (13)$$

Where: $W_{storageN}$ represents the difference between the actual power generation capacity of the photovoltaic panels, the wind turbines and the biomass energy power generation equipment and the total electric energy supplied to the user loads and the power grids; $W_{outN}$ represents the actual power generation capacity of the photovoltaic panels, the wind turbines and the biomass energy power generation equipment;

Assuming the photovoltaic panel generates power with the maximum power point, a result is obtained according to the formula (6):

$$W_{storageN}=W_{outN}-W_N=120 \text{ KW}=-115 \text{ KW}=6.5 \text{ KW}$$

Step 7: If $W_{storageN}=1$, directly supplying power to the user loads and the power grids by the one with the best robustness in the photovoltaic panels, the wind turbines and the biomass energy power generation equipment; if $W_{storageN}>0$, storing the remaining electric energy of the photovoltaic panels, the wind turbines and the biomass energy power generation equipment into the energy storage module; and if $W_{storageN}<0$, replenishing the user loads and the power grids by discharging of the energy storage module;

Because $W_{storageN}=6.5$ KW$>0$, the remaining electric energy (6.5 KW) of No. 2 photovoltaic panel is stored into the energy storage module;

Step 8: Calculating the difference $W_E$ between the actual power generation capacity of the photovoltaic panels, the wind turbines and the biomass energy power generation equipment and the total electric energy actually required by the user loads and the power grids, with the formula shown as follows:

$$W_E=W-W_N \quad (14)$$

If $W_E>0$, replenishing the user loads and the power grids by the micro gas turbines with an amount of $W_E$.

A result is obtained according to the formula (7):

$$W_E = W - W_N$$
$$= 500 \text{ } KW - 113.5 \text{ } KW$$
$$= 386.5 \text{ } KW$$

i.e., the power generation capacity of the micro gas turbines is 386.5 KW.

Figure 11:
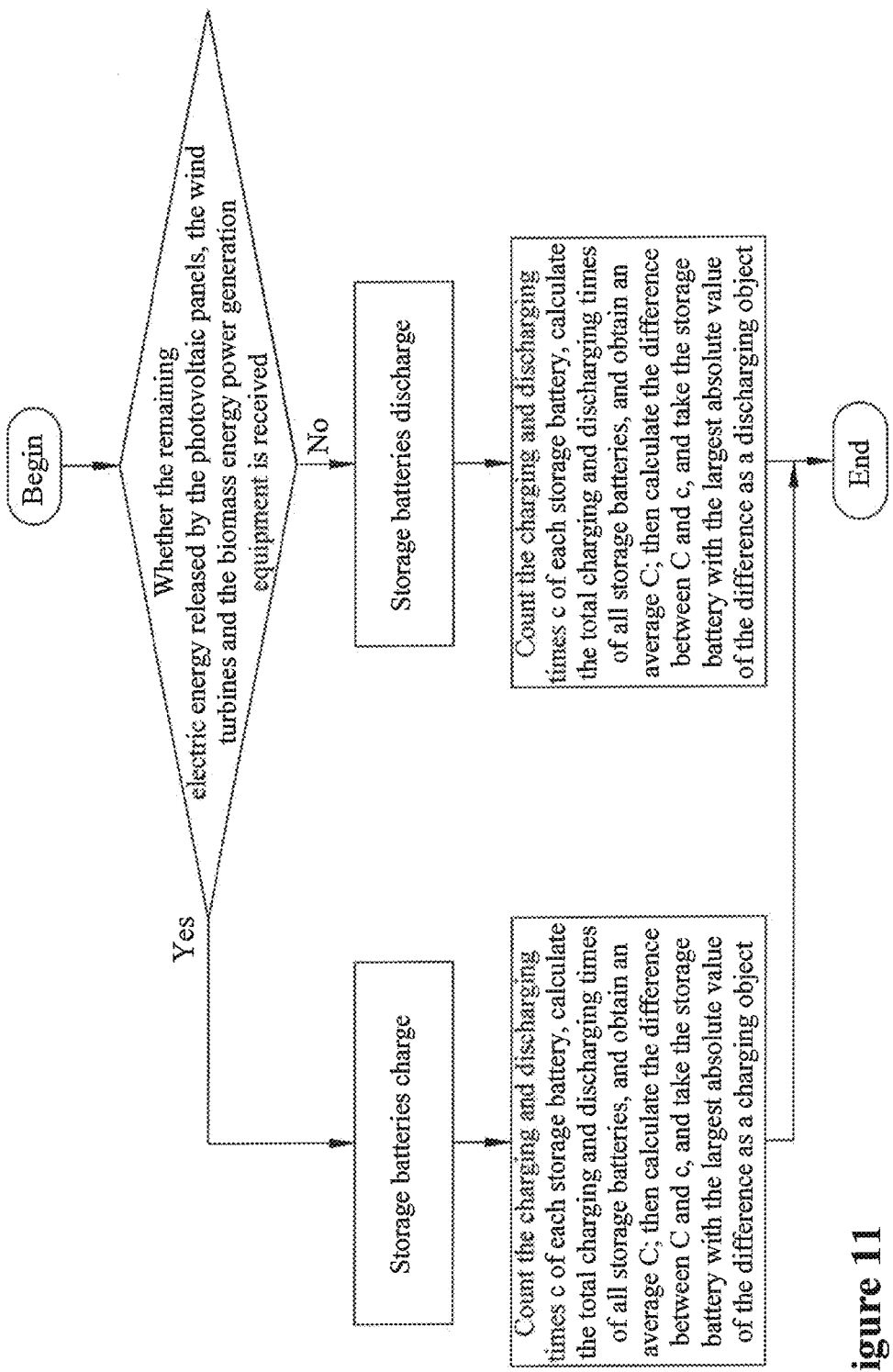
FIG. 11 is the flow chart of the control method for charging and discharging of the energy storage unit in the present invention.

In the embodiment, the flow of the control method for charging and discharging of the energy storage unit is shown in FIG. 11 and comprises the following steps of:

Step 1: if the remaining electric energy released by the photovoltaic panels, the wind turbines and the biomass energy power generation equipment is received, carrying out Step 2 for storage battery charging; if a control signal sent by the distributed renewable energy intelligent optimizing power generation controller is received, carrying out Step 3 for storage battery discharging;

Step 2: Counting the charging and discharging times c of each storage battery; calculating the total charging and discharging times of all storage batteries and obtaining an average C; then calculating the difference between C and c, and taking the storage battery with the largest absolute value of the difference as a charging object;

Step 3: Counting the charging and discharging times c of each storage battery; calculating the total charging and discharging times of all storage batteries and obtaining an average C; then calculating the difference between C and c and taking the storage battery with the largest absolute value of the difference as a discharging object.

In the embodiment, the process for counting the charging and discharging times c of each storage battery, calculating the total charging and discharging times of all storage batteries, obtaining an average C and calculating the difference between C and c comprises the following steps of:

Respectively counting the charging times BatteryinN and the discharging times BatteryoutN of each storage battery by a counter, and expressing the charging times and the discharging times in the form of matrices Countin and Countout, as shown below:

Countin=[Batteryin1 Batteryin2 . . . BatteryinN−1 BatteryinN]

Countout=[Batteryout1 Batteryout2 . . . BatteryoutN−1 BattetyoutN]

Then, the charging and discharging times c of each storage battery can be obtained, and are expressed in a matrix form as shown below:

$$c = [\, c1 \quad c2 \quad \ldots \quad cN\text{-}1 \quad cN \,]$$
$$= Countin + Countout$$
$$= [\, Batteryin1 + Batteryout1 \quad Batteryin2 + Batteryout2 \quad \ldots$$
$$BatteryinN\text{-}1 + BatteryoutN\text{-}1 \quad BatteryinN + BatteryoutN \,]$$

The total charging and discharging times of all storage batteries and the average C can be calculated as follows:

$$C = \frac{\sum_{i=1}^{N} Batteryini + \sum_{j=1}^{N} Batteryouti}{N}$$

The average C is expressed in a matrix form as shown below:

$$C = [\underbrace{C \quad C \quad \ldots \quad C \quad C}_{N}]$$

Carrying out the matrix operation C-c and extracting an element value with the largest absolute value in the obtained matrix. The storage battery which corresponds to the element value is the storage battery selected for charging and discharging.

Figure 8:
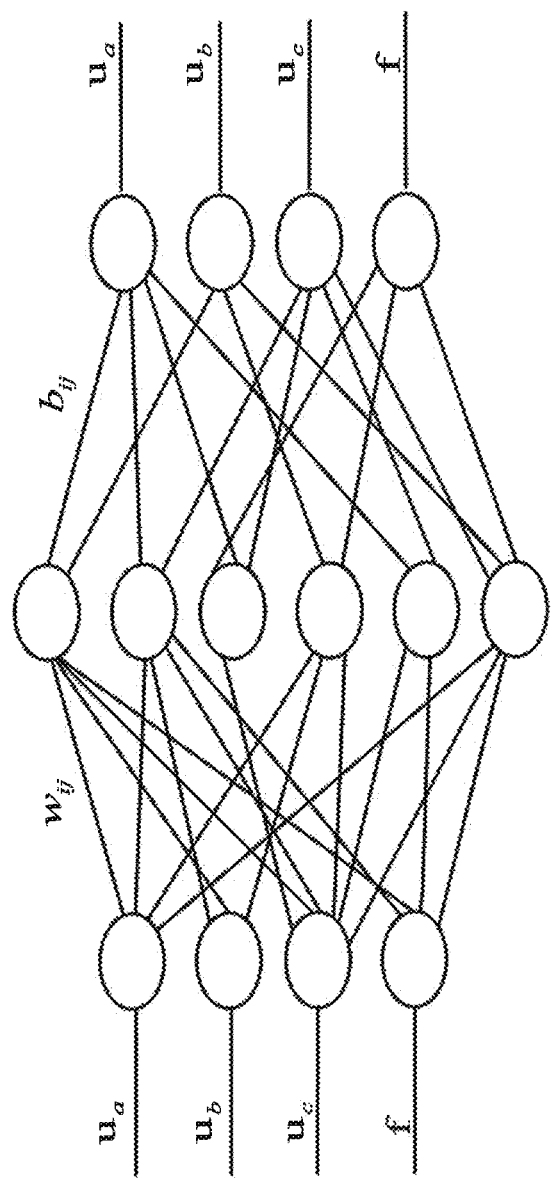
FIG. 8 is the structural diagram of the neural network in the embodiment of the present invention.
Figure 9:
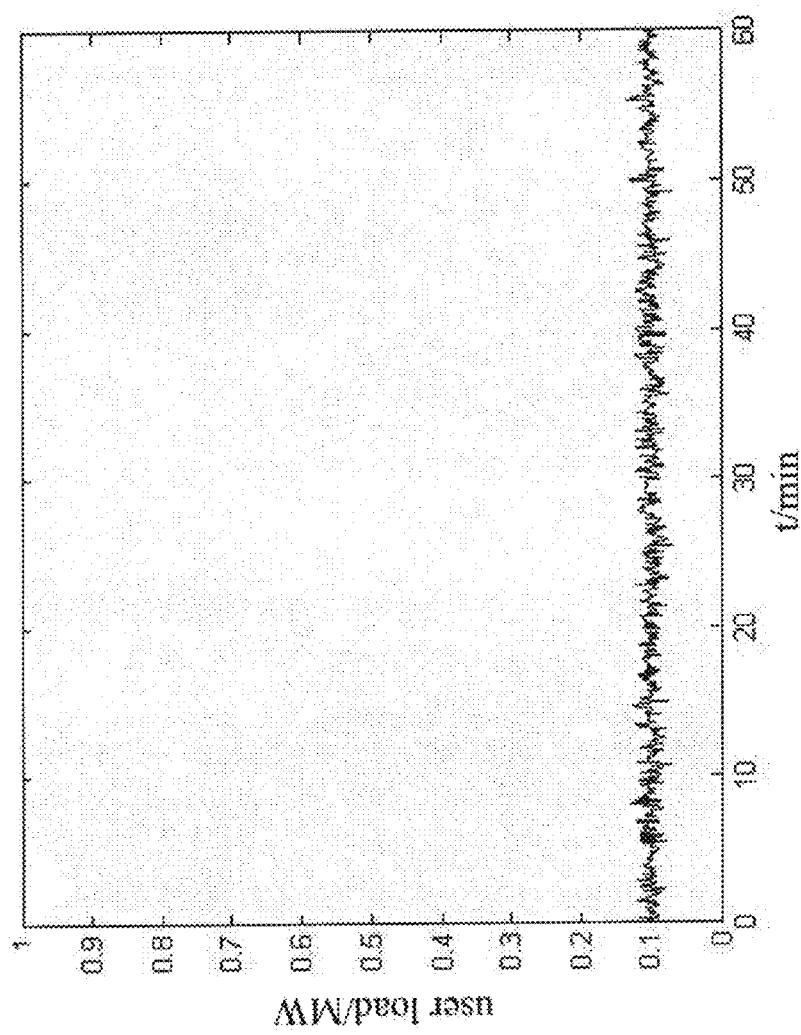
FIG. 9 is the curve of laws of power consumption of the user loads in the embodiment of the present invention.
Figure 12:
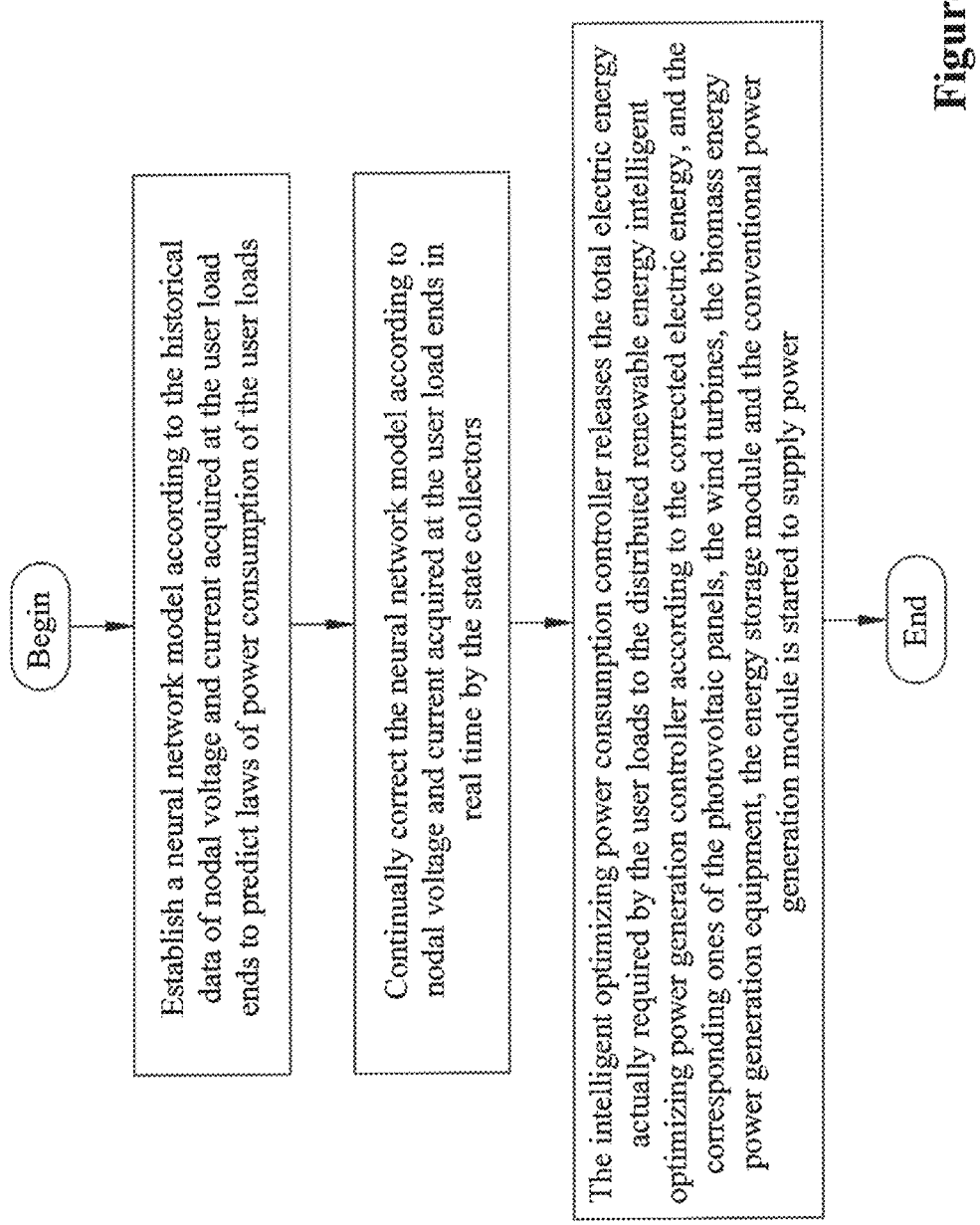
FIG. 12 is the flow chart of the coordination method for laws of power consumption of the user loads.

In the embodiment, the flow of the coordination method for laws of power consumption of the user loads is shown in FIG. 12 and comprises the following steps of:

Step 1: Establishing a neural network model according to the historical data of nodal voltage and current acquired at the user load ends to predict laws of power consumption of the user loads;

The structure of the established neural network model is shown in FIG. 8;

Step 2: Acquiring nodal voltage and current at the user load ends in real time by the state collectors, and continually correcting the neural network model in Step 1;

The historical data of nodal voltage and current acquired in the experiment is extracted. The curves of laws of power consumption of the user loads are obtained by Step 1 and Step 2 in the coordination method. The user loads in the process of the experiment always fluctuate around 0.1 MW;

Step 3: Releasing the total electric energy actually required by the user loads from the intelligent optimizing power consumption controller to the distributed renewable energy intelligent optimizing power generation controller according to the electric energy corrected in Step 2, and starting the corresponding ones of the photovoltaic panels, the wind turbines, the biomass energy power generation equipment, the energy storage module and the conventional power generation module to supply power.

While the present invention has been shown and described with reference to a certain embodiment thereof, it will be understood by those skilled in the field that these are only examples and various changes or revisions may be made therein without departing from the principle and the nature of the present invention. The scope of the present invention is only defined by the appended claims.

What is claimed is:

1. An energy resource-grid-load automatic control system of a smart microgrid, comprising:

a distributed renewable energy power generation module, a distributed renewable energy inverter module, a conventional power generation module, a user load module, a bidirectional grid-connected control module, a distributed renewable energy intelligent optimizing power generation control module and an energy storage module;

wherein the distributed renewable energy power generation module is used for converting solar energy, wind energy and biomass energy into electric energy and supplying power to a plurality of user loads or a plurality of power grids; the distributed renewable energy inverter module is used for converting direct current discharged from a plurality of photovoltaic panels, a plurality of wind turbines and a biomass energy power generation equipment into alternating current; the conventional power generation module is used for controlling a plurality of micro gas turbines to supply power to the user loads or the plurality of power grids; the user load module is a local load in the smart microgrid; and the bidirectional grid-connected control module is used for controlling connection/disconnection and energy transfer between the smart microgrid and the plurality of power grids;

wherein the distributed renewable energy intelligent optimizing power generation control module is used for: 1) acquiring nodal voltage and current of the plurality of photovoltaic panels, the wind turbines and the biomass energy power generation equipment, estimating power generation capacity of the plurality of photovoltaic panels, the wind turbines and the biomass energy power generation equipment within 4 to 5 sampling periods by uncertainty estimation, plotting forecast fluctuation curves of the power generation capacity, respectively calculating the best robustness of the plurality of photovoltaic panels, the wind turbines and the biomass energy power generation equipment, and selecting the one with the best robustness to supply power to the user loads or the plurality of power grids; 2) sending a control signal to an intelligent energy storage unit adjuster when there is a difference between an actual power generation capacity of the plurality of photovoltaic panels, the wind turbines and the biomass energy power generation equipment and the total electric energy supplied to the user loads and the plurality of power grids; and 3) sending control signals to a plurality of micro gas turbine power generation controllers when the power generation capacity of the plurality of photovoltaic panels, the wind turbines and the biomass energy power generation equipment and the electric energy released from the energy storage module differ from the total electric energy required by the user loads and the plurality of power grids;

wherein the energy storage module is used for controlling charging and discharging of a storage battery pack to ensure average charging and discharging times of each storage battery;

wherein the energy storage module comprises an intelligent energy storage unit adjuster and the storage battery pack;

wherein if a remaining electric energy of the plurality of photovoltaic panels, the wind turbines and the biomass energy power generation equipment is received, the intelligent energy storage unit adjuster calculates a total charging and discharging times of each storage battery, then compares results with the average of the total charging and discharging times of all storage batteries, and selects the storage battery with the largest difference for charging; if the power generation capacity of the plurality of photovoltaic panels, the wind turbines and the biomass energy power generation equipment cannot meet needs of the user loads or the plurality of power grids, the intelligent energy storage unit adjuster receives a power generation control signal sent by a distributed renewable energy intelligent optimizing power generation controller to control the storage battery pack to discharge, calculates the total charging and discharging times of each storage battery, compares the result with the average of the total charging and discharging times of all storage batteries, and selects the storage battery with the largest difference for discharging;

wherein the storage battery pack is used for storing or releasing the remaining electric energy of the plurality of photovoltaic panels, the wind turbines and the biomass energy power generation equipment;

wherein the conventional power generation module comprises a micro gas turbine intelligent optimizing power generation control unit and a micro gas turbine power generation unit;

wherein the micro gas turbine intelligent optimizing power generation control unit is used for replenishing the user loads or the plurality of power grids with the electric energy generated by the plurality of micro gas turbines when the power generation capacity of the plurality of photovoltaic panels, the wind turbines and the biomass energy power generation equipment and the electric energy released from the energy storage module cannot meet the needs of the user loads or the plurality of power grids; and the micro gas turbine power generation unit is used for supplying power to the user loads or the plurality of power grids;

wherein the user load module comprises an intelligent optimizing power consumption controller and a plurality of state collectors;

wherein the intelligent optimizing power consumption controller is used for establishing a load matrix of voltage and current signals acquired at load ends by the plurality of state collectors, constructing laws of power consumption of the user loads by neural network modeling, and automatically controlling the power consumption of the user loads by the laws; and the plurality of state collectors are used for acquiring nodal voltage and current at the user load ends in real time.

2. The energy resource-grid-load automatic control system of the smart microgrid according to claim 1, wherein the distributed renewable energy power generation module is connected with the distributed renewable energy inverter module by DC buses; the DC buses consist of three segments and are arranged separately; output ends of a photovoltaic power generation unit are respectively connected with input ends of a photovoltaic power generation inverter unit by a first segment of DC bus (Bus 1), a second segment of DC bus (Bus 2) and a third segment of DC bus (Bus 3); output ends of a wind power generation unit are respectively connected with input ends of a wind power generation inverter unit by the first segment of DC bus (Bus 1), the second segment of DC bus (Bus 2) and the third segment of DC bus (Bus 3); output ends of a biomass energy power generation unit are respectively connected with input ends of a biomass energy power generation inverter unit by the first segment of DC bus (Bus 1), the second segment of DC bus (Bus 2) and the third segment of DC bus (Bus 3).

3. The energy resource-grid-load automatic control system of the smart microgrid according to claim 2, wherein an input end of the energy storage module is simultaneously connected with the first segment of DC bus (Bus 1), the second segment of DC bus (Bus 2) and the third segment of DC bus (Bus 3).

4. An intelligent optimizing control method for distributed renewable energy power generation, using the energy resource-grid-load automatic control system of a smart microgrid of claim 1, the method comprising the following steps:

step 1: acquiring nodal voltage and current of the plurality of photovoltaic panels, the wind turbines and the biomass energy power generation equipment by Hall element measurement;

step 2: estimating the power generation capacity of the plurality of photovoltaic panels, the wind turbines and the biomass energy power generation equipment by uncertainty estimation, including resistance, reactance and PV nodal voltage; wherein the specific formulas are shown as follows:

for estimation of resistance and reactance:

$$R_{m+4}=R_{m+3}=R_{m+2}=R_{m+1}=0.01R_{m-7}+0.03R_{m-6}+0.06R_{m-5}+0.1R_{m-4}+0.15R_{m-3}+0.16R_{m-2}+0.22R_{m-1}+0.30R_m \quad (1)$$

where: $R_m$ represents the resistance in the mth sampling period; $R_{m+n}$ represents the estimated resistance in the (m+n)th sampling period, wherein n=−7, −6, −5, −4, −3, −2, −1, 1, 2, 3, 4;

$$X_{m+4}=X_{m+3}=X_{m+2}=X_{m+1}=0.15X_{m-2}+0.25X_{m-1}+0.6X_m \quad (2)$$

where: $X_m$ represents the reactance in the mth sampling period; $X_{m+p}$ represents the estimated reactance in the (m+p)th sampling period, wherein p=−2, −1, 1, 2, 3, 4;

for estimation of PV nodal voltage:

$$U_{+4}=U_{+3}=U_{+2}U_{+1}=0.01U_{m-7}+0.03U_{m-6}+0.06U_{m-5}+0.1U_{m-4}+0.15U_{m-3}+0.16U_{m-2}+0.22U_{m-1}+0.30U \quad (3)$$

where: $U_m$ represents the PV nodal voltage in the mth sampling period; $U_{m+n}$ represents the estimated PV nodal voltage in the (m+n)th sampling period, wherein n=−7, −6, −5, −4, −3, −2, −1, 1, 2, 3, 4;

step 3: plotting the forecast fluctuation curves of the power generation capacity according to the PV nodal voltage obtained in Step 2, with the time as an abscissa and the PV nodal voltage as an ordinate;

step 4: calculating the robustness of the power generation capacity of the plurality of photovoltaic panels, the wind turbines and the biomass energy power generation equipment, and selecting the one with the best robustness to supply power to the user loads or the plurality of power grids; the formula for calculation of the robustness is shown as follows:

$$D_N = \frac{1}{7}\sqrt{\begin{array}{c}(U_m - U_{ms})^2 + (U_{m-1} - U_{ms})^2 + (U_{m-3} - U_{ms})^2 + \\ (U_{m-5} - U_{ms})^2 + (U_{m-7} - U_{ms})^2\end{array}} \quad (4)$$

$D_N$ represents a robustness value, and a smaller value indicates that the robustness is better; $U_{ms}$ represents nodal voltage in a mains supply;

step 5: calculating the total electric energy supplied to the user loads and the plurality of power grids by the plurality of photovoltaic panels, the wind turbines and the biomass energy power generation equipment, with the formula shown as follows:

$$W_N = \frac{\alpha D_N}{D_1 + D_2 + D_3 + \ldots + D_{N-2} + D_{N-1} + D_N} W \quad (5)$$

where: $W_N$ represents the total electric energy mentioned in Step 5, and W represents the total electric energy actually required by the user loads and the plurality of power grids; α represents a parameter of power generation type; for the wind turbines, α=0.1; for the plurality of photovoltaic panels, α=0.83; for the biomass energy power generation equipment, α=0.92;

step 6: calculating the difference between the actual power generation capacity of the plurality of photovoltaic panels, the wind turbines and the biomass energy power generation equipment and the total electric energy supplied to the user loads and the plurality of power grids, with the formula shown as follows:

$$W_{storageN} = W_{outN} - W_N \quad (6)$$

where: $W_{storageN}$ represents the difference between the actual power generation capacity of the plurality of photovoltaic panels, the wind turbines and the biomass energy power generation equipment and the total electric energy supplied to the user loads and the plurality of power grids; $W_{outN}$ represents the actual power generation capacity of the plurality of photovoltaic panels, the wind turbines and the biomass energy power generation equipment;

step 7: if $W_{storageN}=0$, directly supplying power to the user loads and the plurality of power grids by the one with the best robustness in the plurality of photovoltaic panels, the wind turbines and the biomass energy power generation equipment; if $W_{storageN}>0$, storing the remaining electric energy of the plurality of photovoltaic panels, the wind turbines and the biomass energy power generation equipment into the energy storage module; and if $W_{storageN}<0$, replenishing the user loads and the plurality of power grids by discharging of the energy storage module; and step 8: calculating the difference $W_E$ between the actual power generation capacity of the plurality of photovoltaic panels, the wind turbines and the biomass energy power generation equipment and the total electric energy actually required by the user loads and the plurality of power grids, with the formula shown as follows:

$$W_E = W - W_N \quad (7)$$

if $W_E>0$, replenishing the user loads and the plurality of power grids by the plurality of micro gas turbines with an amount of $W_E$.

5. A control method for charging and discharging of the energy storage unit, using the energy resource-grid-load automatic control system of smart microgrid of claim 1, the method comprising the following steps:

step 1: if the remaining electric energy released by the plurality of photovoltaic panels, the wind turbines and the biomass energy power generation equipment is received, carrying out step 2 for storage battery charging; if a control signal sent by the distributed renewable energy intelligent optimizing power generation controller is received, carrying out step 3 for storage battery discharging;

step 2: counting the charging and discharging times c of each storage battery; calculating the total charging and discharging times of all storage batteries and obtaining an average C; then calculating the difference between C and c, and taking the storage battery with the largest absolute value of the difference as a charging object; and step 3: counting the charging and discharging times c of each storage battery; calculating the total charging and discharging times of all storage batteries and obtaining an average C; then calculating the difference between C and c and taking the storage battery with the largest absolute value of the difference as a discharging object.

6. A coordination method for laws of power consumption of the user loads, using the energy resource-grid-load automatic control system of smart microgrid of claim 1, the method comprising the following steps:

step 1: establishing a neural network model according to historical data of nodal voltage and current acquired at the user load ends to predict laws of power consumption of the user loads;

step 2: acquiring nodal voltage and current at the user load ends in real time by the plurality of state collectors, and continually correcting the neural network model in Step 1; and step 3: releasing the total electric energy actually required by the user loads from the intelligent optimizing power consumption controller to the distributed renewable energy intelligent optimizing power generation controller according to the electric energy corrected in Step 2, and starting corresponding ones of the plurality of photovoltaic panels, the wind turbines, the biomass energy power generation equipment, the energy storage module and the conventional power generation module to supply power.

* * * * *